United States Patent [19]
Liao

[11] 4,032,977
[45] June 28, 1977

[54] GRAY SCALE INTERPOLATION TECHNIQUE

[75] Inventor: Henry H. J. Liao, Carrollton, Tex.

[73] Assignee: Xerox Corporation, Stamford, Conn.

[22] Filed: June 3, 1976

[21] Appl. No.: 692,604

[52] U.S. Cl. .............................................. 358/280
[51] Int. Cl.$^2$ ....................................... H04N 1/40
[58] Field of Search .......... 358/188, 263, 280, 284, 358/260

[56] References Cited
UNITED STATES PATENTS

3,921,204  11/1975  Thompson .......................... 358/13

*Primary Examiner*—John C. Martin

[57] ABSTRACT

Expanded gray scale information is recovered from quantized video input data in a raster scanned imaging system by utilizing an interpolation process to predict a gray scale value for each element of output data from the quantized levels of a $m \times n$ matrix of input data elements. The prediction matrix for each output data element includes the spatially corresponding input data element, together with vertically and horizontally input data elements.

26 Claims, 2 Drawing Figures

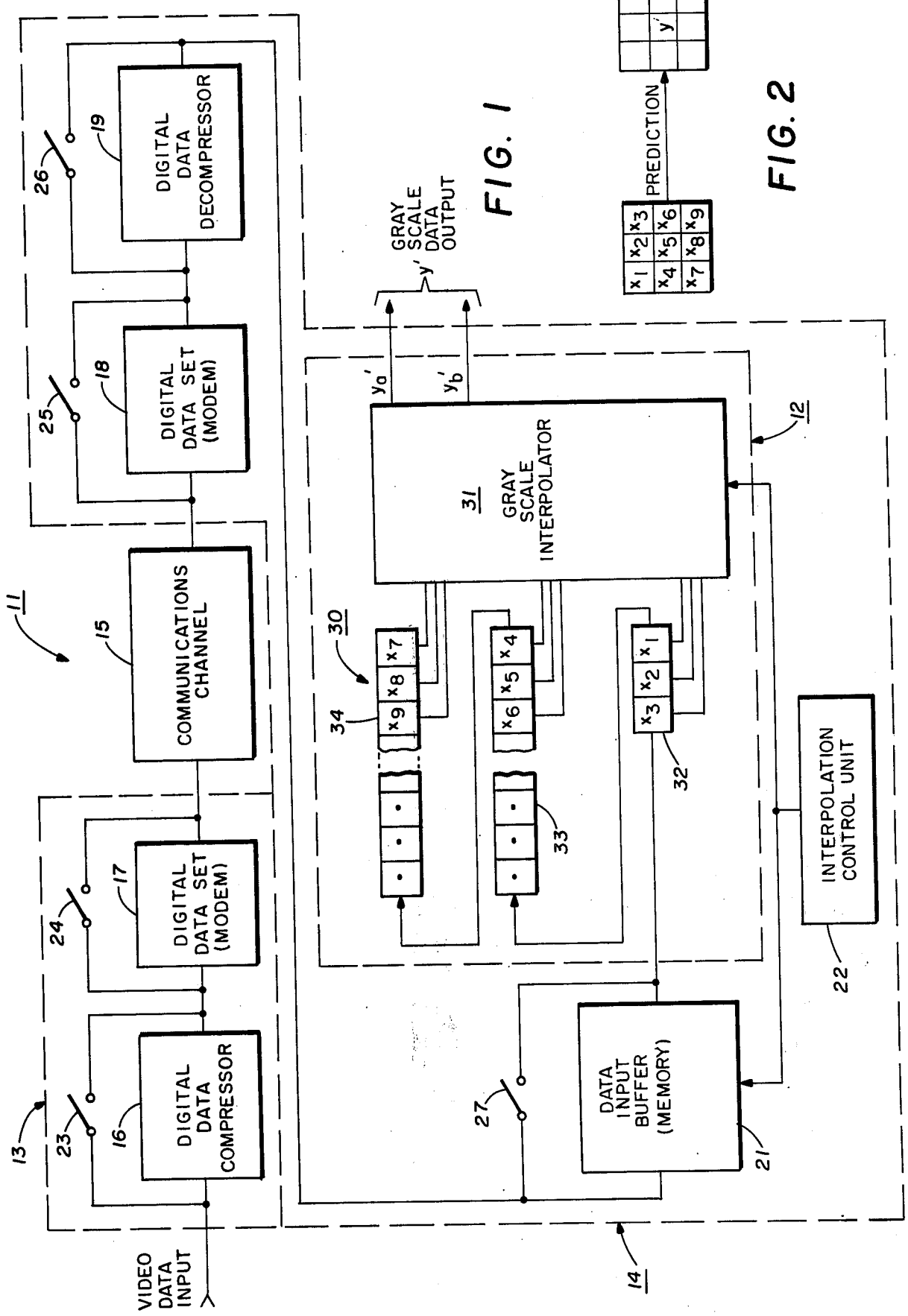

GRAY SCALE INTERPOLATION TECHNIQUE

CROSS REFERENCE TO RELATED APPLICATION

A technique similar to that of the present invention may be employed to either increase or decrease the vertical resolution of a facsimile signal, as disclosed in applicant's copending application Ser. No. 692,420, entitled "Statistical Resolution Conversion Technique", filed concurrently herewith.

BACKGROUND OF THE INVENTION

This invention relates to raster scanned imaging system and, more particularly, to methods and means for recovering expanded gray scale information from a quantized video signal in such an imaging system.

By definition, an original document (whether it be a printed or written page, a drawing, photograph, or anything else of like character) is a two dimensional, generally continuous pattern of reflectance. The image or information content of a document can be entered into various types of electronic processing systems by a one dimensional sampling process, known as "raster input scanning", whereby the information content of the document is serially converted or re-mapped into a one dimensional video signal. Moreover, "raster output scanning" is available for serially reconstructing a processed version of the document in response to the video signal. Indeed, raster input and output scanning are widespread use in commercially available facsimile systems, to name just one of the better known types of "raster scanned imaging system."

If the video signal is preserved in an analog form, the continuous or gray scale aspect of the original document is retained. However, if the video signal is quantized, there are unadvoidable quantization errors which inherently result in a loss of gray scale information. As will be appreciated, the image degrading effects of the gray scale loss are a function of the coarseness of the quantization process. Half-toning may, of course, be used to at least partially compensate for the loss of gray scale information, but the effectivity of that technique is a function of the resolution provided for the imaging system. Thus, there is a particularly serious problem in low resolution system which involve coarse quantization of the video signal. A case in point is provided by modern, high speed facsimile systems in which the video signal is digitized so that digital data compression techniques can be employed to achieve reduced document transmission times.

SUMMARY OF THE INVENTION

Accordingly, an object of the present invention is to provide methods and means for electronically recovering expanded gray scale information from quantized video signals in raster scanned imaging systems.

Another object of this invention is to provide improved method and means for reducing the data degrading effects of quantizing the video signal in a facsimile system or other low resolution raster scanned imaging system. A more detailed, related object provide methods and means for improving the gray scale capabilities of digital facsimile systems and the like relying on binary transmission.

Briefly, to carry out these and other objects of the invention, there is an interpolator to predict a gray scale value for each element of video output data on the basis of the quantized levels of a m x n matrix of video input data elements. The prediction matrix for each output data element includes the spatially corresponding input data element, together with a number of vertically and horizontally adjacent input data elements. Preferably, the interpolator is constructed in accordance with predetermined probabilistic information to carry out a maximum likelihood estimation process so that the gray scale information is introduced with minimum statistical error.

BRIEF DESCRIPTION OF THE DRAWINGS

Still further objects and advantages of the present invention will become apparent when the following detailed description is read in conjunction with the attached drawings, in which:

FIG. 1 is a simplified block diagram of a raster scanned imaging system including a gray scale interpolator constructed in accordance with the present invention; and FIG. 2 illustrates the prediction matrix for the gray scale interpolator shown in FIG. 1.

DETAILED DESCRIPTION OF THE ILLUSTRATED EMBODIMENT

While the invention is described in some detail hereinafter with specific reference to a single exemplary embodiment, it is to be understood that there is no intent to limit it to that embodiment. On the contrary, the aim is to cover all modifications, alternatives, and equivalents falling within the spirit and scope of the invention as defined by the appended claims.

Turning now to the drawings, and at this point especially to FIG. 1, there is a raster scanned imaging system 11 which includes an interpolator 12 for electronically recovering expanded gray scale information from a quantized video signal in accordance with the present invention. As illustrated, the imaging system 11 is a digital facsimile system having a transmitting terminal 13 and a receiving terminal 14 which are interconnected on, say, a demand basis by a communications channel 15.

In practice, there typically is a raster input scanner (not shown) within the transmitting terminal 13 for serially converting the information content of a subject copy (i.e., an original document) into a corresponding video signal. That signal is then operated on by an analog-to-digital converter (also not shown) so that a quantized or binary version of the video signal is applied to a digital data compressor 16. There, a predetermined source encoding process, such as run length encoding, is carried out to eliminate redundant data. Then, the digitally compressed signal is fed to a digital data set or modem 17 for transmission to the receiving terminal 14 via the communications channel 15.

At the receiving terminal 14, there is another digital data set or modem 18 for applying the incoming digitally compressed video signal to a digital data decompressor 19 where the redundant data is more or less completely restored. From there, the reconstructed digital video signal is suitably fed into a buffer or memory 21 for application to the interpolator 12 in response to clock pulses supplied by an interpolation control unit 22. As explained in more detail hereinafter, the interpolator 12 provides a plurality of output bits $y_a$, $y_b$ to digitally represent a predicted gray scale value $y$ for each video data element. Accordingly, the output bits from the interpolar 12 are suitably applied to a digital-to-analog converter (not shown) to supply a gray scale drive signal for a raster output scanner (also not shown) which, in turn, prints the desired facsimile copy.

It may be helpful to mention that the gray scale prediction function of the interpolator 12 could equally as well be carried out in response to the original digital video signal. To emphasize that point, there are switches 23–27 which may be closed to complete bypass paths around the data compressor 16, the data sets 17 and 18, the data decompressor 19, and the buffer 21, respectively. Nevertheless, as a practical matter, it is expected that there normally will be some processing or manipulation of the digital data upstream of the interpolator 12.

In accordance with the present invention, the interpolator 12 relies on the quantized levels of a m × n matrix of input video data elements to predict a gray scale value for each output video data element. The prediction matrix for each output data element includes the spatially corresponding input data element, together with a number of vertically and horizontally adjacent input data elements. As used herein, "spatially corresponding" input and output data elements represent picture elements occupying substantially identical positions on the input copy (e.g., subject copy) and the output copy (e.g., facsimile copy), respectively. "Vertically and horizontally adjacent input data elements", on the other hand, represent picture elements which are vertically and horizontally adjacent the picture element occupying the "spatially corresponding" position on the input copy.

As shown in FIG. 2 for a 3 × 3 matrix, the m and n indices of the prediction matrix preferably are odd integers so that the matrix is symmetrical with respect to the element for which a gray scale value is to be predicted. However, of the minor prediction errors that might be caused by an asymmetrical relationship can be tolerated, either or both of the m and n indices could be even integers.

Returning to FIG. for a more detailed description of the elements which occupy the same positions with respect to the matrix patterns as the data element for which a gray scale level is to be predicted (for convenience, that positional relationship is referred to hereinafter as "positioned for prediction"). As will be appreciated, each prediction matrix pattern may be expressed as a generalized term:

$$X = (x_1, x_2, \ldots x_j) \quad (1)$$

where
$x_j$ = the quantized level of the $j$th data element of the matrix; and
$j$ = the product of the m and n indices of the matrix.

Accordingly, the frequency statistics define a probability distribution P(X), which gives the probability of the prediction matrix having any given matrix pattern X. Furthermore, the data on the actual gray scale levels of the data elements positioned for prediction may be used to identify a conditional probability $P(y/X)$, where y is an actual or observed gray scale level for the video data elements positioned for prediction in the presence of any given matrix pattern X. Thus, the probability distribution $P(y/X)$ states the probability of any given gray scale value y being the most likely gray scale value for the video data element positioned for prediction in response to any given matrix pattern X.

If a gray scale value $y'$ is assigned as the predicted gray scale value for a given matrix pattern X, the expected probability that the prediction will be in error is:

$$P_e = \sum_X \sum_{y \neq y'} P(y/X) P(X) \quad (2)$$

As a matter of definition:

$$\sum_{y \neq y'} P(y/X) = 1 - P(y'/X) \quad (3)$$

Accordingly the expected prediction error $P_e$ is minimized if the predicted gray scale value $y'$ for the given input matrix pattern X is selected so that:

$$P(y'/X) \geq P(y/X) \text{ for all } y \neq y' \quad (4)$$

In short, such a selected gray scale value is a maximum likelihood predictor.

It will be evident that the quantized or gray scale values of the video data elements at the inputs and outputs of the interpolation means 31 may come from the sets (0,1,2, ... I) and (0,1,2, ... J), respectively, where I < J. In practice, however, the input video data elements $x_1$–$x_9$ are usually simple binary bits having quantized values from the set (0,1) and the output video data elements y are typically digital doublets (dibits) from the set (00,01,10,11) or digital triplets (tribits) from the set (000,001,010,011,100,101,110, and 111).

To complete this disclosure, a maximum likelihood truth table giving the most likely one of four different gray scale values for a video output data element as a function of the binary levels of a 3 × 3 matrix of video input data elements is set forth below. Mixed font printed text with horizontally and vertically oriented characters was prescanned to collect the statistics on which this table is based.

3 x 3 MAXIMUM LIKELIHOOD GRAY SCALE

INTERPOLATION TABLE

```
TOTAL NUMBER OF ELEMENTS= 1064960
GRAY COVERAGE= 9.16044%
ERROR PERCENTAGE= 3.30388 %
ONE LEVEL ERROR  = 3.30388 %
TWO LEVEL ERROR  = 0 %
THREE LEVEL ERROR = 0 %
```

| NO | X1 | X2 | X3 | X4 | X5 | X6 | X7 | X8 | X9 | Y | FREQUENCY | ERROR PERCENT |
|----|----|----|----|----|----|----|----|----|----|----|-----------|---------------|
| 0 | 0 | 0 | 0 | 0 | 0 | 0 | 0 | 0 | 0 | 0 | 924429 | .32377 |
| 1 | 0 | 0 | 0 | 0 | 0 | 0 | 0 | 0 | 1 | 0 | 4106 | 2.67901 |

Table -continued

| NO | X1 | X2 | X3 | X4 | X5 | X6 | X7 | X8 | X9 | Y | FREQUENCY | ERROR PERCENT |
|----|----|----|----|----|----|----|----|----|----|---|-----------|---------------|
| 2  | 0 | 0 | 0 | 0 | 0 | 0 | 0 | 1 | 0 | 0 | 231 | 6.06061 |
| 3  | 0 | 0 | 0 | 0 | 0 | 0 | 0 | 1 | 1 | 0 | 2163 | 7.90569 |
| 4  | 0 | 0 | 0 | 0 | 0 | 0 | 1 | 0 | 0 | 0 | 3983 | 7.13030 |
| 5  | 0 | 0 | 0 | 0 | 0 | 0 | 1 | 0 | 1 | 0 | 200 | 6.50000 |
| 6  | 0 | 0 | 0 | 0 | 0 | 0 | 1 | 1 | 0 | 0 | 2184 | 10.94322 |
| 7  | 0 | 0 | 0 | 0 | 0 | 0 | 1 | 1 | 1 | 0 | 4560 | 25.61404 |
| 8  | 0 | 0 | 0 | 0 | 0 | 1 | 0 | 0 | 0 | 0 | 316 | 25.36765 |
| 9  | 0 | 0 | 0 | 0 | 0 | 1 | 0 | 0 | 1 | 0 | 1630 | 25.03067 |
| 10 | 0 | 0 | 0 | 0 | 0 | 1 | 0 | 1 | 0 | 1 | 2 | 50.00000 |
| 11 | 0 | 0 | 0 | 0 | 0 | 1 | 0 | 1 | 1 | 1 | 1166 | 37.65009 |
| 12 | 0 | 0 | 0 | 0 | 0 | 1 | 1 | 0 | 0 | 1 | 23 | 34.78261 |
| 13 | 0 | 0 | 0 | 0 | 0 | 1 | 1 | 0 | 1 | 0 | 60 | 35.00000 |
| 14 | 0 | 0 | 0 | 0 | 0 | 1 | 1 | 1 | 0 | 1 | 4 | .00000 |
| 15 | 0 | 0 | 0 | 0 | 0 | 1 | 1 | 1 | 1 | 1 | 719 | 16.96801 |
| 16 | 0 | 0 | 0 | 0 | 1 | 0 | 0 | 0 | 0 | 2 | 25 | 24.00000 |
| 17 | 0 | 0 | 0 | 0 | 1 | 0 | 0 | 0 | 1 | 3 | 2 | .00000 |
| 18 | 0 | 0 | 0 | 0 | 1 | 0 | 0 | 1 | 0 | 2 | 12 | 41.66667 |
| 19 | 0 | 0 | 0 | 0 | 1 | 0 | 0 | 1 | 1 | 2 | 19 | 15.73947 |
| 20 | 0 | 0 | 0 | 0 | 1 | 0 | 1 | 0 | 0 | 2 | 1 | .00000 |
| 21 | 0 | 0 | 0 | 0 | 1 | 0 | 1 | 0 | 1 | 0 | 0 | .00000 |
| 22 | 0 | 0 | 0 | 0 | 1 | 0 | 1 | 1 | 0 | 2 | 38 | 28.94737 |
| 23 | 0 | 0 | 0 | 0 | 1 | 0 | 1 | 1 | 1 | 2 | 161 | 12.42236 |
| 24 | 0 | 0 | 0 | 0 | 1 | 1 | 0 | 0 | 0 | 3 | 127 | 37.79528 |
| 25 | 0 | 0 | 0 | 0 | 1 | 1 | 0 | 0 | 1 | 3 | 242 | 38.34293 |
| 26 | 0 | 0 | 0 | 0 | 1 | 1 | 0 | 1 | 0 | 3 | 18 | 11.11111 |
| 27 | 0 | 0 | 0 | 0 | 1 | 1 | 0 | 1 | 1 | 2 | 730 | 47.30769 |
| 28 | 0 | 0 | 0 | 0 | 1 | 1 | 1 | 0 | 0 | 0 | 0 | .00000 |
| 29 | 0 | 0 | 0 | 0 | 1 | 1 | 1 | 0 | 1 | 2 | 5 | 40.00000 |
| 30 | 0 | 0 | 0 | 0 | 1 | 1 | 1 | 1 | 0 | 3 | 99 | 16.16162 |
| 31 | 0 | 0 | 0 | 0 | 1 | 1 | 1 | 1 | 1 | 2 | 1042 | 40.78695 |
| 32 | 0 | 0 | 0 | 1 | 0 | 0 | 0 | 0 | 0 | 1 | 316 | 31.05529 |
| 33 | 0 | 0 | 0 | 1 | 0 | 0 | 0 | 0 | 1 | 1 | 9 | 11.11111 |
| 34 | 0 | 0 | 0 | 1 | 0 | 0 | 0 | 1 | 0 | 0 | 3 | 33.33333 |
| 35 | 0 | 0 | 0 | 1 | 0 | 0 | 0 | 1 | 1 | 1 | 5 | 20.00000 |
| 36 | 0 | 0 | 0 | 1 | 0 | 0 | 1 | 0 | 0 | 1 | 1919 | 41.68838 |
| 37 | 0 | 0 | 0 | 1 | 0 | 0 | 1 | 0 | 1 | 1 | 28 | 46.42857 |
| 38 | 0 | 0 | 0 | 1 | 0 | 0 | 1 | 1 | 0 | 1 | 1003 | 18.44467 |
| 39 | 0 | 0 | 0 | 1 | 0 | 0 | 1 | 1 | 1 | 1 | 603 | 16.25207 |
| 40 | 0 | 0 | 0 | 1 | 0 | 1 | 0 | 0 | 0 | 1 | 46 | 8.69565 |
| 41 | 0 | 0 | 0 | 1 | 0 | 1 | 0 | 0 | 1 | 1 | 9 | .00000 |
| 42 | 0 | 0 | 0 | 1 | 0 | 1 | 0 | 1 | 0 | 0 | 0 | .00000 |
| 43 | 0 | 0 | 0 | 1 | 0 | 1 | 0 | 1 | 1 | 0 | 0 | .00000 |
| 44 | 0 | 0 | 0 | 1 | 0 | 1 | 1 | 0 | 0 | 1 | 38 | 21.05263 |
| 45 | 0 | 0 | 0 | 1 | 0 | 1 | 1 | 0 | 1 | 1 | 31 | 19.35484 |
| 46 | 0 | 0 | 0 | 1 | 0 | 1 | 1 | 1 | 0 | 1 | 5 | .00000 |
| 47 | 0 | 0 | 0 | 1 | 0 | 1 | 1 | 1 | 1 | 1 | 103 | 6.79612 |
| 48 | 0 | 0 | 0 | 1 | 1 | 0 | 0 | 0 | 0 | 3 | 130 | 36.92308 |
| 49 | 0 | 0 | 0 | 1 | 1 | 0 | 0 | 0 | 1 | 3 | 1 | .00000 |
| 50 | 0 | 0 | 0 | 1 | 1 | 0 | 0 | 1 | 0 | 3 | 12 | 25.00000 |
| 51 | 0 | 0 | 0 | 1 | 1 | 0 | 0 | 1 | 1 | 3 | 34 | 8.82353 |
| 52 | 0 | 0 | 0 | 1 | 1 | 0 | 1 | 0 | 0 | 3 | 243 | 45.67901 |
| 53 | 0 | 0 | 0 | 1 | 1 | 0 | 1 | 0 | 1 | 2 | 1 | .00000 |
| 54 | 0 | 0 | 0 | 1 | 1 | 0 | 1 | 1 | 0 | 3 | 1056 | 42.61364 |
| 55 | 0 | 0 | 0 | 1 | 1 | 0 | 1 | 1 | 1 | 3 | 913 | 48.84995 |

Table -continued

| NO | X1 | X2 | X3 | X4 | X5 | X6 | X7 | X8 | X9 | Y | FREQUENCY | ERROR PERCENT |
|---|---|---|---|---|---|---|---|---|---|---|---|---|
| 56 | 0 | 0 | 0 | 1 | 1 | 1 | 0 | 0 | 0 | 3 | 279 | 3.22581 |
| 57 | 0 | 0 | 0 | 1 | 1 | 1 | 0 | 0 | 1 | 3 | 215 | .46512 |
| 58 | 0 | 0 | 0 | 1 | 1 | 1 | 0 | 1 | 0 | 3 | 32 | 3.12500 |
| 59 | 0 | 0 | 0 | 1 | 1 | 1 | 0 | 1 | 1 | 3 | 473 | .42283 |
| 60 | 0 | 0 | 0 | 1 | 1 | 1 | 1 | 0 | 0 | 3 | 286 | .34965 |
| 61 | 0 | 0 | 0 | 1 | 1 | 1 | 1 | 0 | 1 | 3 | 80 | 5.00000 |
| 62 | 0 | 0 | 0 | 1 | 1 | 1 | 1 | 1 | 0 | 3 | 531 | .75330 |
| 63 | 0 | 0 | 0 | 1 | 1 | 1 | 1 | 1 | 1 | 3 | 3445 | 13.32366 |
| 64 | 0 | 0 | 1 | 0 | 0 | 0 | 0 | 0 | 0 | 0 | 3672 | 3.43137 |
| 65 | 0 | 0 | 1 | 0 | 0 | 0 | 0 | 0 | 1 | 0 | 202 | 1.48515 |
| 66 | 0 | 0 | 1 | 0 | 0 | 0 | 0 | 1 | 0 | 0 | 4 | .00000 |
| 67 | 0 | 0 | 1 | 0 | 0 | 0 | 0 | 1 | 1 | 0 | 69 | 31.88406 |
| 68 | 0 | 0 | 1 | 0 | 0 | 0 | 1 | 0 | 0 | 0 | 60 | 10.00000 |
| 69 | 0 | 0 | 1 | 0 | 0 | 0 | 1 | 0 | 1 | 0 | 7 | .00000 |
| 70 | 0 | 0 | 1 | 0 | 0 | 0 | 1 | 1 | 0 | 0 | 15 | 6.66667 |
| 71 | 0 | 0 | 1 | 0 | 0 | 0 | 1 | 1 | 1 | 0 | 75 | 36.00000 |
| 72 | 0 | 0 | 1 | 0 | 0 | 1 | 0 | 0 | 0 | 0 | 1688 | 29.85782 |
| 73 | 0 | 0 | 1 | 0 | 0 | 1 | 0 | 0 | 1 | 0 | 5768 | 20.66574 |
| 74 | 0 | 0 | 1 | 0 | 0 | 1 | 0 | 1 | 0 | 1 | 7 | 28.57143 |
| 75 | 0 | 0 | 1 | 0 | 0 | 1 | 0 | 1 | 1 | 1 | 807 | 26.02230 |
| 76 | 0 | 0 | 1 | 0 | 0 | 1 | 1 | 0 | 0 | 0 | 36 | 47.22222 |
| 77 | 0 | 0 | 1 | 0 | 0 | 1 | 1 | 0 | 1 | 0 | 87 | 41.37931 |
| 78 | 0 | 0 | 1 | 0 | 0 | 1 | 1 | 1 | 0 | 1 | 4 | 25.00000 |
| 79 | 0 | 0 | 1 | 0 | 0 | 1 | 1 | 1 | 1 | 1 | 380 | 29.47368 |
| 80 | 0 | 0 | 1 | 0 | 1 | 0 | 0 | 0 | 0 | 3 | 2 | 50.00000 |
| 81 | 0 | 0 | 1 | 0 | 1 | 0 | 0 | 0 | 1 | 0 | 0 | .00000 |
| 82 | 0 | 0 | 1 | 0 | 1 | 0 | 0 | 1 | 0 | 3 | 2 | 50.00000 |
| 83 | 0 | 0 | 1 | 0 | 1 | 0 | 0 | 1 | 1 | 2 | 6 | 16.66667 |
| 84 | 0 | 0 | 1 | 0 | 1 | 0 | 1 | 0 | 0 | 3 | 1 | .00000 |
| 85 | 0 | 0 | 1 | 0 | 1 | 0 | 1 | 0 | 1 | 0 | 0 | .00000 |
| 86 | 0 | 0 | 1 | 0 | 1 | 0 | 1 | 1 | 0 | 3 | 2 | .00000 |
| 87 | 0 | 0 | 1 | 0 | 1 | 0 | 1 | 1 | 1 | 2 | 7 | 14.28571 |
| 88 | 0 | 0 | 1 | 0 | 1 | 1 | 0 | 0 | 0 | 3 | 252 | 48.30952 |
| 89 | 0 | 0 | 1 | 0 | 1 | 1 | 0 | 0 | 1 | 2 | 309 | 36.56958 |
| 90 | 0 | 0 | 1 | 0 | 1 | 1 | 0 | 1 | 0 | 3 | 24 | 8.33333 |
| 91 | 0 | 0 | 1 | 0 | 1 | 1 | 0 | 1 | 1 | 3 | 903 | 48.17276 |
| 92 | 0 | 0 | 1 | 0 | 1 | 1 | 1 | 0 | 0 | 3 | 3 | 33.33333 |
| 93 | 0 | 0 | 1 | 0 | 1 | 1 | 1 | 0 | 1 | 2 | 4 | 25.00000 |
| 94 | 0 | 0 | 1 | 0 | 1 | 1 | 1 | 1 | 0 | 3 | 97 | 9.27835 |
| 95 | 0 | 0 | 1 | 0 | 1 | 1 | 1 | 1 | 1 | 3 | 602 | 38.70432 |
| 96 | 0 | 0 | 1 | 1 | 0 | 0 | 0 | 0 | 0 | 1 | 19 | 31.57895 |
| 97 | 0 | 0 | 1 | 1 | 0 | 0 | 0 | 0 | 1 | 0 | 0 | .00000 |
| 98 | 0 | 0 | 1 | 1 | 0 | 0 | 0 | 1 | 0 | 0 | 0 | .00000 |
| 99 | 0 | 0 | 1 | 1 | 0 | 0 | 0 | 1 | 1 | 0 | 0 | .00000 |
| 100 | 0 | 0 | 1 | 1 | 0 | 0 | 1 | 0 | 0 | 1 | 40 | 42.50000 |
| 101 | 0 | 0 | 1 | 1 | 0 | 0 | 1 | 0 | 1 | 0 | 1 | .00000 |
| 102 | 0 | 0 | 1 | 1 | 0 | 0 | 1 | 1 | 0 | 1 | 2 | 50.00000 |
| 103 | 0 | 0 | 1 | 1 | 0 | 0 | 1 | 1 | 1 | 1 | 18 | 5.55556 |
| 104 | 0 | 0 | 1 | 1 | 0 | 1 | 0 | 0 | 0 | 1 | 55 | 9.09091 |
| 105 | 0 | 0 | 1 | 1 | 0 | 1 | 0 | 0 | 1 | 1 | 12 | 8.33333 |
| 106 | 0 | 0 | 1 | 1 | 0 | 1 | 0 | 1 | 0 | 0 | 0 | .00000 |
| 107 | 0 | 0 | 1 | 1 | 0 | 1 | 0 | 1 | 1 | 0 | 0 | .00000 |
| 108 | 0 | 0 | 1 | 1 | 0 | 1 | 1 | 0 | 0 | 1 | 22 | 4.54545 |

Table -continued

| NO | X1 | X2 | X3 | X4 | X5 | X6 | X7 | X8 | X9 | Y | FREQUENCY | ERROR PERCENT |
|---|---|---|---|---|---|---|---|---|---|---|---|---|
| 109 | 0 | 0 | 1 | 1 | 0 | 1 | 1 | 0 | 1 | 1 | 34 | 14.70588 |
| 110 | 0 | 0 | 1 | 1 | 0 | 1 | 1 | 1 | 0 | 0 | 0 | .00000 |
| 111 | 0 | 0 | 1 | 1 | 0 | 1 | 1 | 1 | 1 | 1 | 43 | 9.30233 |
| 112 | 0 | 0 | 1 | 1 | 1 | 0 | 0 | 0 | 0 | 3 | 4 | .00000 |
| 113 | 0 | 0 | 1 | 1 | 1 | 0 | 0 | 0 | 1 | 0 | 0 | .00000 |
| 114 | 0 | 0 | 1 | 1 | 1 | 0 | 0 | 1 | 0 | 0 | 0 | .00000 |
| 115 | 0 | 0 | 1 | 1 | 1 | 0 | 0 | 1 | 1 | 0 | 0 | .00000 |
| 116 | 0 | 0 | 1 | 1 | 1 | 0 | 1 | 0 | 0 | 3 | 4 | 50.00000 |
| 117 | 0 | 0 | 1 | 1 | 1 | 0 | 1 | 0 | 1 | 0 | 0 | .00000 |
| 118 | 0 | 0 | 1 | 1 | 1 | 0 | 1 | 1 | 0 | 3 | 2 | .00000 |
| 119 | 0 | 0 | 1 | 1 | 1 | 0 | 1 | 1 | 1 | 2 | 19 | 47.36842 |
| 120 | 0 | 0 | 1 | 1 | 1 | 1 | 0 | 0 | 0 | 3 | 287 | 3.13539 |
| 121 | 0 | 0 | 1 | 1 | 1 | 1 | 0 | 0 | 1 | 3 | 93 | 8.60215 |
| 122 | 0 | 0 | 1 | 1 | 1 | 1 | 0 | 1 | 0 | 3 | 15 | .00000 |
| 123 | 0 | 0 | 1 | 1 | 1 | 1 | 0 | 1 | 1 | 3 | 49 | .00000 |
| 124 | 0 | 0 | 1 | 1 | 1 | 1 | 1 | 0 | 0 | 3 | 146 | .00000 |
| 125 | 0 | 0 | 1 | 1 | 1 | 1 | 1 | 0 | 1 | 3 | 25 | 16.00000 |
| 126 | 0 | 0 | 1 | 1 | 1 | 1 | 1 | 1 | 0 | 3 | 295 | .33898 |
| 127 | 0 | 0 | 1 | 1 | 1 | 1 | 1 | 1 | 1 | 3 | 603 | 13.10116 |
| 128 | 0 | 1 | 0 | 0 | 0 | 0 | 0 | 0 | 0 | 0 | 209 | 3.82775 |
| 129 | 0 | 1 | 0 | 0 | 0 | 0 | 0 | 0 | 1 | 0 | 5 | .00000 |
| 130 | 0 | 1 | 0 | 0 | 0 | 0 | 0 | 1 | 0 | 0 | 1 | .00000 |
| 131 | 0 | 1 | 0 | 0 | 0 | 0 | 0 | 1 | 1 | 1 | 2 | 50.00000 |
| 132 | 0 | 1 | 0 | 0 | 0 | 0 | 1 | 0 | 0 | 0 | 4 | .00000 |
| 133 | 0 | 1 | 0 | 0 | 0 | 0 | 1 | 0 | 1 | 0 | 0 | .00000 |
| 134 | 0 | 1 | 0 | 0 | 0 | 0 | 1 | 1 | 0 | 0 | 5 | 40.00000 |
| 135 | 0 | 1 | 0 | 0 | 0 | 0 | 1 | 1 | 1 | 1 | 10 | 50.00000 |
| 136 | 0 | 1 | 0 | 0 | 0 | 1 | 0 | 0 | 0 | 1 | 2 | 50.00000 |
| 137 | 0 | 1 | 0 | 0 | 0 | 1 | 0 | 0 | 1 | 1 | 4 | 50.00000 |
| 138 | 0 | 1 | 0 | 0 | 0 | 1 | 0 | 1 | 0 | 0 | 0 | .00000 |
| 139 | 0 | 1 | 0 | 0 | 0 | 1 | 0 | 1 | 1 | 1 | 1 | .00000 |
| 140 | 0 | 1 | 0 | 0 | 0 | 1 | 1 | 0 | 0 | 0 | 0 | .00000 |
| 141 | 0 | 1 | 0 | 0 | 0 | 1 | 1 | 0 | 1 | 0 | 0 | .00000 |
| 142 | 0 | 1 | 0 | 0 | 0 | 1 | 1 | 1 | 0 | 1 | 2 | .00000 |
| 143 | 0 | 1 | 0 | 0 | 0 | 1 | 1 | 1 | 1 | 1 | 6 | .00000 |
| 144 | 0 | 1 | 0 | 0 | 1 | 0 | 0 | 0 | 0 | 3 | 13 | 30.76923 |
| 145 | 0 | 1 | 0 | 0 | 1 | 0 | 0 | 0 | 1 | 3 | 1 | .00000 |
| 146 | 0 | 1 | 0 | 0 | 1 | 0 | 0 | 1 | 0 | 3 | 84 | 2.38095 |
| 147 | 0 | 1 | 0 | 0 | 1 | 0 | 0 | 1 | 1 | 3 | 66 | 1.51515 |
| 148 | 0 | 1 | 0 | 0 | 1 | 0 | 1 | 0 | 0 | 2 | 1 | .00000 |
| 149 | 0 | 1 | 0 | 0 | 1 | 0 | 1 | 0 | 1 | 0 | 0 | .00000 |
| 150 | 0 | 1 | 0 | 0 | 1 | 0 | 1 | 1 | 0 | 3 | 28 | .00000 |
| 151 | 0 | 1 | 0 | 0 | 1 | 0 | 1 | 1 | 1 | 3 | 67 | 1.49254 |
| 152 | 0 | 1 | 0 | 0 | 1 | 1 | 0 | 0 | 0 | 3 | 5 | .00000 |
| 153 | 0 | 1 | 0 | 0 | 1 | 1 | 0 | 0 | 1 | 3 | 6 | 16.66667 |
| 154 | 0 | 1 | 0 | 0 | 1 | 1 | 0 | 1 | 0 | 3 | 8 | .00000 |
| 155 | 0 | 1 | 0 | 0 | 1 | 1 | 0 | 1 | 1 | 3 | 84 | 1.19048 |
| 156 | 0 | 1 | 0 | 0 | 1 | 1 | 1 | 0 | 0 | 0 | 0 | .00000 |
| 157 | 0 | 1 | 0 | 0 | 1 | 1 | 1 | 0 | 1 | 0 | 0 | .00000 |
| 158 | 0 | 1 | 0 | 0 | 1 | 1 | 1 | 1 | 0 | 3 | 2 | 50.00000 |
| 159 | 0 | 1 | 0 | 0 | 1 | 1 | 1 | 1 | 1 | 3 | 59 | 18.64407 |
| 160 | 0 | 1 | 0 | 1 | 0 | 0 | 0 | 0 | 0 | 1 | 7 | 14.28571 |
| 161 | 0 | 1 | 0 | 1 | 0 | 0 | 0 | 0 | 1 | 0 | 0 | .00000 |

Table-continued

| NO | X1 | X2 | X3 | X4 | X5 | X6 | X7 | X8 | X9 | Y | FREQUENCY | ERROR PERCENT |
|---|---|---|---|---|---|---|---|---|---|---|---|---|
| 162 | 0 | 1 | 0 | 1 | 0 | 0 | 0 | 1 | 0 | 0 | 0 | .00000 |
| 163 | 0 | 1 | 0 | 1 | 0 | 0 | 0 | 1 | 1 | 0 | 0 | .00000 |
| 164 | 0 | 1 | 0 | 1 | 0 | 0 | 1 | 0 | 0 | 1 | 2 | .00000 |
| 165 | 0 | 1 | 0 | 1 | 0 | 0 | 1 | 0 | 1 | 0 | 0 | .00000 |
| 166 | 0 | 1 | 0 | 1 | 0 | 0 | 1 | 1 | 0 | 1 | 2 | .00000 |
| 167 | 0 | 1 | 0 | 1 | 0 | 0 | 1 | 1 | 1 | 1 | 2 | .00000 |
| 168 | 0 | 1 | 0 | 1 | 0 | 1 | 0 | 0 | 0 | 0 | 0 | .00000 |
| 169 | 0 | 1 | 0 | 1 | 0 | 1 | 0 | 0 | 1 | 0 | 0 | .00000 |
| 170 | 0 | 1 | 0 | 1 | 0 | 1 | 0 | 1 | 0 | 0 | 0 | .00000 |
| 171 | 0 | 1 | 0 | 1 | 0 | 1 | 0 | 1 | 1 | 0 | 0 | .00000 |
| 172 | 0 | 1 | 0 | 1 | 0 | 1 | 1 | 0 | 0 | 0 | 0 | .00000 |
| 173 | 0 | 1 | 0 | 1 | 0 | 1 | 1 | 0 | 1 | 0 | 0 | .00000 |
| 174 | 0 | 1 | 0 | 1 | 0 | 1 | 1 | 1 | 0 | 0 | 0 | .00000 |
| 175 | 0 | 1 | 0 | 1 | 0 | 1 | 1 | 1 | 1 | 0 | 0 | .00000 |
| 176 | 0 | 1 | 0 | 1 | 1 | 0 | 0 | 0 | 0 | 3 | 14 | 14.28571 |
| 177 | 0 | 1 | 0 | 1 | 1 | 0 | 0 | 0 | 1 | 0 | 0 | .00000 |
| 178 | 0 | 1 | 0 | 1 | 1 | 0 | 0 | 1 | 0 | 3 | 14 | .00000 |
| 179 | 0 | 1 | 0 | 1 | 1 | 0 | 0 | 1 | 1 | 3 | 4 | .00000 |
| 180 | 0 | 1 | 0 | 1 | 1 | 0 | 1 | 0 | 0 | 3 | 14 | 21.42857 |
| 181 | 0 | 1 | 0 | 1 | 1 | 0 | 1 | 0 | 1 | 0 | 0 | .00000 |
| 182 | 0 | 1 | 0 | 1 | 1 | 0 | 1 | 1 | 0 | 3 | 53 | 9.43396 |
| 183 | 0 | 1 | 0 | 1 | 1 | 0 | 1 | 1 | 1 | 3 | 62 | 16.12903 |
| 184 | 0 | 1 | 0 | 1 | 1 | 1 | 0 | 0 | 0 | 3 | 22 | .00000 |
| 185 | 0 | 1 | 0 | 1 | 1 | 1 | 0 | 0 | 1 | 3 | 27 | .00000 |
| 186 | 0 | 1 | 0 | 1 | 1 | 1 | 0 | 1 | 0 | 3 | 6 | .00000 |
| 187 | 0 | 1 | 0 | 1 | 1 | 1 | 0 | 1 | 1 | 3 | 51 | .00000 |
| 188 | 0 | 1 | 0 | 1 | 1 | 1 | 1 | 0 | 0 | 3 | 8 | .00000 |
| 189 | 0 | 1 | 0 | 1 | 1 | 1 | 1 | 0 | 1 | 3 | 5 | .00000 |
| 190 | 0 | 1 | 0 | 1 | 1 | 1 | 1 | 1 | 0 | 3 | 20 | .00000 |
| 191 | 0 | 1 | 0 | 1 | 1 | 1 | 1 | 1 | 1 | 3 | 148 | .00000 |
| 192 | 0 | 1 | 1 | 0 | 0 | 0 | 0 | 0 | 0 | 0 | 2044 | 8.41487 |
| 193 | 0 | 1 | 1 | 0 | 0 | 0 | 0 | 0 | 1 | 0 | 16 | 12.50000 |
| 194 | 0 | 1 | 1 | 0 | 0 | 0 | 0 | 1 | 0 | 0 | 1 | .00000 |
| 195 | 0 | 1 | 1 | 0 | 0 | 0 | 0 | 1 | 1 | 0 | 45 | 46.66667 |
| 196 | 0 | 1 | 1 | 0 | 0 | 0 | 1 | 0 | 0 | 0 | 10 | 30.00000 |
| 197 | 0 | 1 | 1 | 0 | 0 | 0 | 1 | 0 | 1 | 0 | 0 | .00000 |
| 198 | 0 | 1 | 1 | 0 | 0 | 0 | 1 | 1 | 0 | 0 | 19 | 36.84211 |
| 199 | 0 | 1 | 1 | 0 | 0 | 0 | 1 | 1 | 1 | 1 | 80 | 35.00000 |
| 200 | 0 | 1 | 1 | 0 | 0 | 1 | 0 | 0 | 0 | 1 | 1032 | 33.23643 |
| 201 | 0 | 1 | 1 | 0 | 0 | 1 | 0 | 0 | 1 | 1 | 837 | 32.85544 |
| 202 | 0 | 1 | 1 | 0 | 0 | 1 | 0 | 1 | 0 | 1 | 11 | 9.09091 |
| 203 | 0 | 1 | 1 | 0 | 0 | 1 | 0 | 1 | 1 | 1 | 160 | 5.00000 |
| 204 | 0 | 1 | 1 | 0 | 0 | 1 | 1 | 0 | 0 | 1 | 3 | 33.33333 |
| 205 | 0 | 1 | 1 | 0 | 0 | 1 | 1 | 0 | 1 | 0 | 11 | 45.45455 |
| 206 | 0 | 1 | 1 | 0 | 0 | 1 | 1 | 1 | 0 | 1 | 4 | 25.00000 |
| 207 | 0 | 1 | 1 | 0 | 0 | 1 | 1 | 1 | 1 | 1 | 68 | 25.00000 |
| 208 | 0 | 1 | 1 | 0 | 1 | 0 | 0 | 0 | 0 | 2 | 13 | 33.46154 |
| 209 | 0 | 1 | 1 | 0 | 1 | 0 | 0 | 0 | 1 | 2 | 8 | 25.00000 |
| 210 | 0 | 1 | 1 | 0 | 1 | 0 | 0 | 1 | 0 | 3 | 49 | .00000 |
| 211 | 0 | 1 | 1 | 0 | 1 | 0 | 0 | 1 | 1 | 3 | 34 | 35.29412 |
| 212 | 0 | 1 | 1 | 0 | 1 | 0 | 1 | 0 | 0 | 3 | 7 | 42.85714 |
| 213 | 0 | 1 | 1 | 0 | 1 | 0 | 1 | 0 | 1 | 0 | 0 | .00000 |
| 214 | 0 | 1 | 1 | 0 | 1 | 0 | 1 | 1 | 0 | 3 | 25 | 4.00000 |

Table -continued

| NO | X1 | X2 | X3 | X4 | X5 | X6 | X7 | X8 | X9 | Y | FREQUENCY | ERROR PERCENT |
|---|---|---|---|---|---|---|---|---|---|---|---|---|
| 215 | 0 | 1 | 1 | 0 | 1 | 0 | 1 | 1 | 1 | 3 | 16 | 25.00000 |
| 216 | 0 | 1 | 1 | 0 | 1 | 1 | 0 | 0 | 0 | 3 | 903 | 43.85382 |
| 217 | 0 | 1 | 1 | 0 | 1 | 1 | 0 | 0 | 1 | 3 | 939 | 44.51544 |
| 218 | 0 | 1 | 1 | 0 | 1 | 1 | 0 | 1 | 0 | 3 | 62 | 3.22581 |
| 219 | 0 | 1 | 1 | 0 | 1 | 1 | 0 | 1 | 1 | 3 | 3525 | 36.70922 |
| 220 | 0 | 1 | 1 | 0 | 1 | 1 | 1 | 0 | 0 | 3 | 5 | 40.00000 |
| 221 | 0 | 1 | 1 | 0 | 1 | 1 | 1 | 0 | 1 | 0 | 0 | .00000 |
| 222 | 0 | 1 | 1 | 0 | 1 | 1 | 1 | 1 | 0 | 3 | 161 | 4.96894 |
| 223 | 0 | 1 | 1 | 0 | 1 | 1 | 1 | 1 | 1 | 3 | 926 | 9.71922 |
| 224 | 0 | 1 | 1 | 1 | 0 | 0 | 0 | 0 | 0 | 1 | 5 | 20.00000 |
| 225 | 0 | 1 | 1 | 1 | 0 | 0 | 0 | 0 | 1 | 0 | 0 | .00000 |
| 226 | 0 | 1 | 1 | 1 | 0 | 0 | 0 | 1 | 0 | 0 | 0 | .00000 |
| 227 | 0 | 1 | 1 | 1 | 0 | 0 | 0 | 1 | 1 | 0 | 0 | .00000 |
| 228 | 0 | 1 | 1 | 1 | 0 | 0 | 1 | 0 | 0 | 1 | 4 | .00000 |
| 229 | 0 | 1 | 1 | 1 | 0 | 0 | 1 | 0 | 1 | 0 | 0 | .00000 |
| 230 | 0 | 1 | 1 | 1 | 0 | 0 | 1 | 1 | 0 | 0 | 3 | 33.33333 |
| 231 | 0 | 1 | 1 | 1 | 0 | 0 | 1 | 1 | 1 | 1 | 26 | 15.38462 |
| 232 | 0 | 1 | 1 | 1 | 0 | 1 | 0 | 0 | 0 | 1 | 4 | .00000 |
| 233 | 0 | 1 | 1 | 1 | 0 | 1 | 0 | 0 | 1 | 0 | 0 | .00000 |
| 234 | 0 | 1 | 1 | 1 | 0 | 1 | 0 | 1 | 0 | 0 | 0 | .00000 |
| 235 | 0 | 1 | 1 | 1 | 0 | 1 | 0 | 1 | 1 | 0 | 0 | .00000 |
| 236 | 0 | 1 | 1 | 1 | 0 | 1 | 1 | 0 | 0 | 1 | 3 | .00000 |
| 237 | 0 | 1 | 1 | 1 | 0 | 1 | 1 | 0 | 1 | 1 | 2 | .00000 |
| 238 | 0 | 1 | 1 | 1 | 0 | 1 | 1 | 1 | 0 | 0 | 0 | .00000 |
| 239 | 0 | 1 | 1 | 1 | 0 | 1 | 1 | 1 | 1 | 1 | 1 | .00000 |
| 240 | 0 | 1 | 1 | 1 | 1 | 0 | 0 | 0 | 0 | 3 | 35 | 20.00000 |
| 241 | 0 | 1 | 1 | 1 | 1 | 0 | 0 | 0 | 1 | 0 | 0 | .00000 |
| 242 | 0 | 1 | 1 | 1 | 1 | 0 | 0 | 1 | 0 | 3 | 3 | .00000 |
| 243 | 0 | 1 | 1 | 1 | 1 | 0 | 0 | 1 | 1 | 3 | 3 | .00000 |
| 244 | 0 | 1 | 1 | 1 | 1 | 0 | 1 | 0 | 0 | 3 | 66 | 15.15152 |
| 245 | 0 | 1 | 1 | 1 | 1 | 0 | 1 | 0 | 1 | 0 | 0 | .00000 |
| 246 | 0 | 1 | 1 | 1 | 1 | 0 | 1 | 1 | 0 | 3 | 188 | 4.25532 |
| 247 | 0 | 1 | 1 | 1 | 1 | 0 | 1 | 1 | 1 | 3 | 110 | 15.45455 |
| 248 | 0 | 1 | 1 | 1 | 1 | 1 | 0 | 0 | 0 | 3 | 604 | 2.64901 |
| 249 | 0 | 1 | 1 | 1 | 1 | 1 | 0 | 0 | 1 | 3 | 90 | 2.22222 |
| 250 | 0 | 1 | 1 | 1 | 1 | 1 | 0 | 1 | 0 | 3 | 28 | .00000 |
| 251 | 0 | 1 | 1 | 1 | 1 | 1 | 0 | 1 | 1 | 3 | 327 | 2.44648 |
| 252 | 0 | 1 | 1 | 1 | 1 | 1 | 1 | 0 | 0 | 3 | 333 | 1.80180 |
| 253 | 0 | 1 | 1 | 1 | 1 | 1 | 1 | 0 | 1 | 3 | 32 | .00000 |
| 254 | 0 | 1 | 1 | 1 | 1 | 1 | 1 | 1 | 0 | 3 | 593 | .00000 |
| 255 | 0 | 1 | 1 | 1 | 1 | 1 | 1 | 1 | 1 | 3 | 1093 | 3.84263 |
| 256 | 1 | 0 | 0 | 0 | 0 | 0 | 0 | 0 | 0 | 0 | 3592 | 5.56793 |
| 257 | 1 | 0 | 0 | 0 | 0 | 0 | 0 | 0 | 1 | 0 | 49 | 12.24490 |
| 258 | 1 | 0 | 0 | 0 | 0 | 0 | 0 | 1 | 0 | 0 | 6 | .00000 |
| 259 | 1 | 0 | 0 | 0 | 0 | 0 | 0 | 1 | 1 | 1 | 14 | 50.00000 |
| 260 | 1 | 0 | 0 | 0 | 0 | 0 | 1 | 0 | 0 | 0 | 240 | 15.41667 |
| 261 | 1 | 0 | 0 | 0 | 0 | 0 | 1 | 0 | 1 | 0 | 7 | 14.28571 |
| 262 | 1 | 0 | 0 | 0 | 0 | 0 | 1 | 1 | 0 | 0 | 63 | 22.22222 |
| 263 | 1 | 0 | 0 | 0 | 0 | 0 | 1 | 1 | 1 | 1 | 59 | 47.45763 |
| 264 | 1 | 0 | 0 | 0 | 0 | 1 | 0 | 0 | 0 | 0 | 8 | 37.50000 |
| 265 | 1 | 0 | 0 | 0 | 0 | 1 | 0 | 0 | 1 | 0 | 11 | 27.27273 |
| 266 | 1 | 0 | 0 | 0 | 0 | 1 | 0 | 1 | 0 | 0 | 0 | .00000 |
| 267 | 1 | 0 | 0 | 0 | 0 | 1 | 0 | 1 | 1 | 1 | 4 | 25.00000 |

| NO | X1 | X2 | X3 | X4 | X5 | X6 | X7 | X8 | X9 | Y | FREQUENCY | ERROR PERCENT |
|---|---|---|---|---|---|---|---|---|---|---|---|---|
| 268 | 1 | 0 | 0 | 0 | 0 | 1 | 1 | 0 | 0 | 0 | 0 | .00000 |
| 269 | 1 | 0 | 0 | 0 | 0 | 1 | 1 | 0 | 1 | 0 | 0 | .00000 |
| 270 | 1 | 0 | 0 | 0 | 0 | 1 | 1 | 1 | 0 | 0 | 0 | .00000 |
| 271 | 1 | 0 | 0 | 0 | 0 | 1 | 1 | 1 | 1 | 1 | 16 | 6.25000 |
| 272 | 1 | 0 | 0 | 0 | 1 | 0 | 0 | 0 | 0 | 2 | 1 | .00000 |
| 273 | 1 | 0 | 0 | 0 | 1 | 0 | 0 | 0 | 1 | 2 | 1 | .00000 |
| 274 | 1 | 0 | 0 | 0 | 1 | 0 | 0 | 1 | 0 | 2 | 2 | .00000 |
| 275 | 1 | 0 | 0 | 0 | 1 | 0 | 0 | 1 | 1 | 0 | 0 | .00000 |
| 276 | 1 | 0 | 0 | 0 | 1 | 0 | 1 | 0 | 0 | 0 | 0 | .00000 |
| 277 | 1 | 0 | 0 | 0 | 1 | 0 | 1 | 0 | 1 | 0 | 0 | .00000 |
| 278 | 1 | 0 | 0 | 0 | 1 | 0 | 1 | 1 | 0 | 2 | 1 | .00000 |
| 279 | 1 | 0 | 0 | 0 | 1 | 0 | 1 | 1 | 1 | 3 | 1 | .00000 |
| 280 | 1 | 0 | 0 | 0 | 1 | 1 | 0 | 0 | 0 | 2 | 2 | .00000 |
| 281 | 1 | 0 | 0 | 0 | 1 | 1 | 0 | 0 | 1 | 2 | 1 | .00000 |
| 282 | 1 | 0 | 0 | 0 | 1 | 1 | 0 | 1 | 0 | 0 | 0 | .00000 |
| 283 | 1 | 0 | 0 | 0 | 1 | 1 | 0 | 1 | 1 | 2 | 6 | 33.33333 |
| 284 | 1 | 0 | 0 | 0 | 1 | 1 | 1 | 0 | 0 | 2 | 3 | .00000 |
| 285 | 1 | 0 | 0 | 0 | 1 | 1 | 1 | 0 | 1 | 0 | 0 | .00000 |
| 286 | 1 | 0 | 0 | 0 | 1 | 1 | 1 | 1 | 0 | 2 | 3 | .00000 |
| 287 | 1 | 0 | 0 | 0 | 1 | 1 | 1 | 1 | 1 | 2 | 13 | 7.69231 |
| 288 | 1 | 0 | 0 | 1 | 0 | 0 | 0 | 0 | 0 | 1 | 1565 | 37.25240 |
| 289 | 1 | 0 | 0 | 1 | 0 | 0 | 0 | 0 | 1 | 0 | 17 | 47.05882 |
| 290 | 1 | 0 | 0 | 1 | 0 | 0 | 0 | 1 | 0 | 0 | 1 | .00000 |
| 291 | 1 | 0 | 0 | 1 | 0 | 0 | 0 | 1 | 1 | 1 | 2 | .00000 |
| 292 | 1 | 0 | 0 | 1 | 0 | 0 | 1 | 0 | 0 | 1 | 3727 | 39.46874 |
| 293 | 1 | 0 | 0 | 1 | 0 | 0 | 1 | 0 | 1 | 0 | 33 | 42.42424 |
| 294 | 1 | 0 | 0 | 1 | 0 | 0 | 1 | 1 | 0 | 1 | 965 | 19.48187 |
| 295 | 1 | 0 | 0 | 1 | 0 | 0 | 1 | 1 | 1 | 1 | 535 | 22.99065 |
| 296 | 1 | 0 | 0 | 1 | 0 | 1 | 0 | 0 | 0 | 1 | 15 | 13.33333 |
| 297 | 1 | 0 | 0 | 1 | 0 | 1 | 0 | 0 | 1 | 1 | 5 | .00000 |
| 298 | 1 | 0 | 0 | 1 | 0 | 1 | 0 | 1 | 0 | 0 | 0 | .00000 |
| 299 | 1 | 0 | 0 | 1 | 0 | 1 | 0 | 1 | 1 | 0 | 0 | .00000 |
| 300 | 1 | 0 | 0 | 1 | 0 | 1 | 1 | 0 | 0 | 1 | 13 | 23.07692 |
| 301 | 1 | 0 | 0 | 1 | 0 | 1 | 1 | 0 | 1 | 1 | 13 | 11.11111 |
| 302 | 1 | 0 | 0 | 1 | 0 | 1 | 1 | 1 | 0 | 1 | 3 | .00000 |
| 303 | 1 | 0 | 0 | 1 | 0 | 1 | 1 | 1 | 1 | 1 | 40 | 5.00000 |
| 304 | 1 | 0 | 0 | 1 | 1 | 0 | 0 | 0 | 0 | 3 | 333 | 43.54354 |
| 305 | 1 | 0 | 0 | 1 | 1 | 0 | 0 | 0 | 1 | 3 | 3 | 33.33333 |
| 306 | 1 | 0 | 0 | 1 | 1 | 0 | 0 | 1 | 0 | 3 | 19 | 21.05263 |
| 307 | 1 | 0 | 0 | 1 | 1 | 0 | 0 | 1 | 1 | 3 | 44 | 9.09091 |
| 308 | 1 | 0 | 0 | 1 | 1 | 0 | 1 | 0 | 0 | 2 | 233 | 33.19742 |
| 309 | 1 | 0 | 0 | 1 | 1 | 0 | 1 | 0 | 1 | 0 | 0 | .00000 |
| 310 | 1 | 0 | 0 | 1 | 1 | 0 | 1 | 1 | 0 | 3 | 973 | 46.35149 |
| 311 | 1 | 0 | 0 | 1 | 1 | 0 | 1 | 1 | 1 | 3 | 605 | 43.14050 |
| 312 | 1 | 0 | 0 | 1 | 1 | 1 | 0 | 0 | 0 | 3 | 208 | .48077 |
| 313 | 1 | 0 | 0 | 1 | 1 | 1 | 0 | 0 | 1 | 3 | 65 | .00000 |
| 314 | 1 | 0 | 0 | 1 | 1 | 1 | 0 | 1 | 0 | 3 | 13 | .00000 |
| 315 | 1 | 0 | 0 | 1 | 1 | 1 | 0 | 1 | 1 | 3 | 230 | .43478 |
| 316 | 1 | 0 | 0 | 1 | 1 | 1 | 1 | 0 | 0 | 3 | 104 | 7.69231 |
| 317 | 1 | 0 | 0 | 1 | 1 | 1 | 1 | 0 | 1 | 3 | 7 | .00000 |
| 318 | 1 | 0 | 0 | 1 | 1 | 1 | 1 | 1 | 0 | 3 | 89 | 6.74157 |
| 319 | 1 | 0 | 0 | 1 | 1 | 1 | 1 | 1 | 1 | 3 | 875 | 12.45714 |
| 320 | 1 | 0 | 1 | 0 | 0 | 0 | 0 | 0 | 0 | 0 | 251 | 2.39044 |

Table -continued

| NO | X1 | X2 | X3 | X4 | X5 | X6 | X7 | X8 | X9 | Y | FREQUENCY | ERROR PERCENT |
|---|---|---|---|---|---|---|---|---|---|---|---|---|
| 321 | 1 | 0 | 1 | 0 | 0 | 0 | 0 | 0 | 1 | 0 | 5 | 20.00000 |
| 322 | 1 | 0 | 1 | 0 | 0 | 0 | 0 | 1 | 0 | 0 | 0 | .00000 |
| 323 | 1 | 0 | 1 | 0 | 0 | 0 | 0 | 1 | 1 | 0 | 1 | .00000 |
| 324 | 1 | 0 | 1 | 0 | 0 | 0 | 1 | 0 | 0 | 0 | 5 | 20.00000 |
| 325 | 1 | 0 | 1 | 0 | 0 | 0 | 1 | 0 | 1 | 0 | 1 | .00000 |
| 326 | 1 | 0 | 1 | 0 | 0 | 0 | 1 | 1 | 0 | 0 | 1 | .00000 |
| 327 | 1 | 0 | 1 | 0 | 0 | 0 | 1 | 1 | 1 | 0 | 14 | 42.85714 |
| 328 | 1 | 0 | 1 | 0 | 0 | 1 | 0 | 0 | 0 | 0 | 26 | 34.61538 |
| 329 | 1 | 0 | 1 | 0 | 0 | 1 | 0 | 0 | 1 | 0 | 17 | 29.41176 |
| 330 | 1 | 0 | 1 | 0 | 0 | 1 | 0 | 1 | 0 | 0 | 0 | .00000 |
| 331 | 1 | 0 | 1 | 0 | 0 | 1 | 0 | 1 | 1 | 1 | 2 | 50.00000 |
| 332 | 1 | 0 | 1 | 0 | 0 | 1 | 1 | 0 | 0 | 0 | 1 | .00000 |
| 333 | 1 | 0 | 1 | 0 | 0 | 1 | 1 | 0 | 1 | 0 | 2 | .00000 |
| 334 | 1 | 0 | 1 | 0 | 0 | 1 | 1 | 1 | 0 | 0 | 0 | .00000 |
| 335 | 1 | 0 | 1 | 0 | 0 | 1 | 1 | 1 | 1 | 1 | 29 | 31.03448 |
| 336 | 1 | 0 | 1 | 0 | 1 | 0 | 0 | 0 | 0 | 3 | 1 | .00000 |
| 337 | 1 | 0 | 1 | 0 | 1 | 0 | 0 | 0 | 1 | 0 | 0 | .00000 |
| 338 | 1 | 0 | 1 | 0 | 1 | 0 | 0 | 1 | 0 | 0 | 0 | .00000 |
| 339 | 1 | 0 | 1 | 0 | 1 | 0 | 0 | 1 | 1 | 0 | 0 | .00000 |
| 340 | 1 | 0 | 1 | 0 | 1 | 0 | 1 | 0 | 0 | 0 | 0 | .00000 |
| 341 | 1 | 0 | 1 | 0 | 1 | 0 | 1 | 0 | 1 | 0 | 0 | .00000 |
| 342 | 1 | 0 | 1 | 0 | 1 | 0 | 1 | 1 | 0 | 0 | 0 | .00000 |
| 343 | 1 | 0 | 1 | 0 | 1 | 0 | 1 | 1 | 1 | 0 | 0 | .00000 |
| 344 | 1 | 0 | 1 | 0 | 1 | 1 | 0 | 0 | 0 | 0 | 0 | .00000 |
| 345 | 1 | 0 | 1 | 0 | 1 | 1 | 0 | 0 | 1 | 0 | 0 | .00000 |
| 346 | 1 | 0 | 1 | 0 | 1 | 1 | 0 | 1 | 0 | 0 | 0 | .00000 |
| 347 | 1 | 0 | 1 | 0 | 1 | 1 | 0 | 1 | 1 | 3 | 1 | .00000 |
| 348 | 1 | 0 | 1 | 0 | 1 | 1 | 1 | 0 | 0 | 0 | 0 | .00000 |
| 349 | 1 | 0 | 1 | 0 | 1 | 1 | 1 | 0 | 1 | 0 | 0 | .00000 |
| 350 | 1 | 0 | 1 | 0 | 1 | 1 | 1 | 1 | 0 | 0 | 0 | .00000 |
| 351 | 1 | 0 | 1 | 0 | 1 | 1 | 1 | 1 | 1 | 2 | 3 | .00000 |
| 352 | 1 | 0 | 1 | 1 | 0 | 0 | 0 | 0 | 0 | 1 | 47 | 36.17021 |
| 353 | 1 | 0 | 1 | 1 | 0 | 0 | 0 | 0 | 1 | 1 | 1 | .00000 |
| 354 | 1 | 0 | 1 | 1 | 0 | 0 | 0 | 1 | 0 | 0 | 0 | .00000 |
| 355 | 1 | 0 | 1 | 1 | 0 | 0 | 0 | 1 | 1 | 0 | 0 | .00000 |
| 356 | 1 | 0 | 1 | 1 | 0 | 0 | 1 | 0 | 0 | 1 | 55 | 43.63636 |
| 357 | 1 | 0 | 1 | 1 | 0 | 0 | 1 | 0 | 1 | 1 | 4 | 50.00000 |
| 358 | 1 | 0 | 1 | 1 | 0 | 0 | 1 | 1 | 0 | 1 | 6 | .00000 |
| 359 | 1 | 0 | 1 | 1 | 0 | 0 | 1 | 1 | 1 | 1 | 17 | 17.64706 |
| 360 | 1 | 0 | 1 | 1 | 0 | 1 | 0 | 0 | 0 | 1 | 41 | 14.63415 |
| 361 | 1 | 0 | 1 | 1 | 0 | 1 | 0 | 0 | 1 | 1 | 10 | 20.00000 |
| 362 | 1 | 0 | 1 | 1 | 0 | 1 | 0 | 1 | 0 | 1 | 1 | .00000 |
| 363 | 1 | 0 | 1 | 1 | 0 | 1 | 0 | 1 | 1 | 0 | 0 | .00000 |
| 364 | 1 | 0 | 1 | 1 | 0 | 1 | 1 | 0 | 0 | 1 | 19 | 10.52632 |
| 365 | 1 | 0 | 1 | 1 | 0 | 1 | 1 | 0 | 1 | 1 | 22 | 18.18182 |
| 366 | 1 | 0 | 1 | 1 | 0 | 1 | 1 | 1 | 0 | 1 | 1 | .00000 |
| 367 | 1 | 0 | 1 | 1 | 0 | 1 | 1 | 1 | 1 | 1 | 23 | .00000 |
| 368 | 1 | 0 | 1 | 1 | 1 | 0 | 0 | 0 | 0 | 2 | 2 | .00000 |
| 369 | 1 | 0 | 1 | 1 | 1 | 0 | 0 | 0 | 1 | 0 | 0 | .00000 |
| 370 | 1 | 0 | 1 | 1 | 1 | 0 | 0 | 1 | 0 | 0 | 0 | .00000 |
| 371 | 1 | 0 | 1 | 1 | 1 | 0 | 0 | 1 | 1 | 0 | 0 | .00000 |
| 372 | 1 | 0 | 1 | 1 | 1 | 0 | 1 | 0 | 0 | 2 | 2 | .00000 |
| 373 | 1 | 0 | 1 | 1 | 1 | 0 | 1 | 0 | 1 | 0 | 0 | .00000 |

Table -continued

| NO | X1 | X2 | X3 | X4 | X5 | X6 | X7 | X8 | X9 | Y | FREQUENCY | ERROR PERCENT |
|---|---|---|---|---|---|---|---|---|---|---|---|---|
| 374 | 1 | 0 | 1 | 1 | 1 | 0 | 1 | 1 | 0 | 3 | 5 | 40.00000 |
| 375 | 1 | 0 | 1 | 1 | 1 | 0 | 1 | 1 | 1 | 2 | 2 | .00000 |
| 376 | 1 | 0 | 1 | 1 | 1 | 1 | 0 | 0 | 0 | 3 | 65 | 13.84615 |
| 377 | 1 | 0 | 1 | 1 | 1 | 1 | 0 | 0 | 1 | 0 | 0 | .00000 |
| 378 | 1 | 0 | 1 | 1 | 1 | 1 | 0 | 1 | 0 | 3 | 2 | .00000 |
| 379 | 1 | 0 | 1 | 1 | 1 | 1 | 0 | 1 | 1 | 3 | 2 | .00000 |
| 380 | 1 | 0 | 1 | 1 | 1 | 1 | 1 | 0 | 0 | 3 | 39 | 15.38462 |
| 381 | 1 | 0 | 1 | 1 | 1 | 1 | 1 | 0 | 1 | 2 | 5 | 40.00000 |
| 382 | 1 | 0 | 1 | 1 | 1 | 1 | 1 | 1 | 0 | 3 | 25 | .00000 |
| 383 | 1 | 0 | 1 | 1 | 1 | 1 | 1 | 1 | 1 | 3 | 104 | 20.19231 |
| 384 | 1 | 1 | 0 | 0 | 0 | 0 | 0 | 0 | 0 | 0 | 2165 | 10.90069 |
| 385 | 1 | 1 | 0 | 0 | 0 | 0 | 0 | 0 | 1 | 0 | 9 | 33.33333 |
| 386 | 1 | 1 | 0 | 0 | 0 | 0 | 0 | 1 | 0 | 1 | 13 | 46.15385 |
| 387 | 1 | 1 | 0 | 0 | 0 | 0 | 0 | 1 | 1 | 1 | 2 | .00000 |
| 388 | 1 | 1 | 0 | 0 | 0 | 0 | 1 | 0 | 0 | 0 | 40 | 20.00000 |
| 389 | 1 | 1 | 0 | 0 | 0 | 0 | 1 | 0 | 1 | 0 | 1 | .00000 |
| 390 | 1 | 1 | 0 | 0 | 0 | 0 | 1 | 1 | 0 | 0 | 77 | 31.16883 |
| 391 | 1 | 1 | 0 | 0 | 0 | 0 | 1 | 1 | 1 | 1 | 109 | 46.78899 |
| 392 | 1 | 1 | 0 | 0 | 0 | 1 | 0 | 0 | 0 | 0 | 3 | 33.33333 |
| 393 | 1 | 1 | 0 | 0 | 0 | 1 | 0 | 0 | 1 | 1 | 4 | 50.00000 |
| 394 | 1 | 1 | 0 | 0 | 0 | 1 | 0 | 1 | 0 | 0 | 0 | .00000 |
| 395 | 1 | 1 | 0 | 0 | 0 | 1 | 0 | 1 | 1 | 0 | 0 | .00000 |
| 396 | 1 | 1 | 0 | 0 | 0 | 1 | 1 | 0 | 0 | 0 | 0 | .00000 |
| 397 | 1 | 1 | 0 | 0 | 0 | 1 | 1 | 0 | 1 | 0 | 0 | .00000 |
| 398 | 1 | 1 | 0 | 0 | 0 | 1 | 1 | 1 | 0 | 1 | 1 | .00000 |
| 399 | 1 | 1 | 0 | 0 | 0 | 1 | 1 | 1 | 1 | 1 | 10 | .00000 |
| 400 | 1 | 1 | 0 | 0 | 1 | 0 | 0 | 0 | 0 | 3 | 32 | 50.00000 |
| 401 | 1 | 1 | 0 | 0 | 1 | 0 | 0 | 0 | 1 | 2 | 2 | .00000 |
| 402 | 1 | 1 | 0 | 0 | 1 | 0 | 0 | 1 | 0 | 3 | 57 | 5.26316 |
| 403 | 1 | 1 | 0 | 0 | 1 | 0 | 0 | 1 | 1 | 3 | 24 | .00000 |
| 404 | 1 | 1 | 0 | 0 | 1 | 0 | 1 | 0 | 0 | 3 | 2 | 50.00000 |
| 405 | 1 | 1 | 0 | 0 | 1 | 0 | 1 | 0 | 1 | 0 | 0 | .00000 |
| 406 | 1 | 1 | 0 | 0 | 1 | 0 | 1 | 1 | 0 | 3 | 41 | 26.82927 |
| 407 | 1 | 1 | 0 | 0 | 1 | 0 | 1 | 1 | 1 | 3 | 24 | 8.33333 |
| 408 | 1 | 1 | 0 | 0 | 1 | 1 | 0 | 0 | 0 | 3 | 26 | 34.61538 |
| 409 | 1 | 1 | 0 | 0 | 1 | 1 | 0 | 0 | 1 | 3 | 41 | 12.19512 |
| 410 | 1 | 1 | 0 | 0 | 1 | 1 | 0 | 1 | 0 | 3 | 5 | .00000 |
| 411 | 1 | 1 | 0 | 0 | 1 | 1 | 0 | 1 | 1 | 3 | 114 | 1.75439 |
| 412 | 1 | 1 | 0 | 0 | 1 | 1 | 1 | 0 | 0 | 3 | 1 | .00000 |
| 413 | 1 | 1 | 0 | 0 | 1 | 1 | 0 | 1 | 0 | 0 | 0 | .00000 |
| 414 | 1 | 1 | 0 | 0 | 1 | 1 | 1 | 1 | 0 | 3 | 4 | 25.00000 |
| 415 | 1 | 1 | 0 | 0 | 1 | 1 | 1 | 1 | 1 | 3 | 25 | 32.00000 |
| 416 | 1 | 1 | 0 | 1 | 0 | 0 | 0 | 0 | 0 | 1 | 957 | 15.46499 |
| 417 | 1 | 1 | 0 | 1 | 0 | 0 | 0 | 0 | 1 | 0 | 0 | .00000 |
| 418 | 1 | 1 | 0 | 1 | 0 | 0 | 0 | 1 | 0 | 1 | 2 | .00000 |
| 419 | 1 | 1 | 0 | 1 | 0 | 0 | 0 | 1 | 1 | 1 | 3 | 33.33333 |
| 420 | 1 | 1 | 0 | 1 | 0 | 0 | 1 | 0 | 0 | 1 | 575 | 15.30435 |
| 421 | 1 | 1 | 0 | 1 | 0 | 0 | 1 | 0 | 1 | 1 | 12 | 50.00000 |
| 422 | 1 | 1 | 0 | 1 | 0 | 0 | 1 | 1 | 0 | 1 | 156 | 1.92308 |
| 423 | 1 | 1 | 0 | 1 | 0 | 0 | 1 | 1 | 1 | 1 | 54 | 12.96296 |
| 424 | 1 | 1 | 0 | 1 | 0 | 1 | 0 | 0 | 0 | 1 | 1 | .00000 |
| 425 | 1 | 1 | 0 | 1 | 0 | 1 | 0 | 0 | 1 | 1 | 1 | .00000 |
| 426 | 1 | 1 | 0 | 1 | 0 | 1 | 0 | 1 | 0 | 0 | 0 | .00000 |

Table -continued

| NO | X1 | X2 | X3 | X4 | X5 | X6 | X7 | X8 | X9 | Y | FREQUENCY | ERROR PERCENT |
|---|---|---|---|---|---|---|---|---|---|---|---|---|
| 427 | 1 | 1 | 0 | 1 | 0 | 1 | 0 | 1 | 1 | 0 | 0 | .00000 |
| 428 | 1 | 1 | 0 | 1 | 0 | 1 | 1 | 0 | 0 | 0 | 0 | .00000 |
| 429 | 1 | 1 | 0 | 1 | 0 | 1 | 1 | 0 | 1 | 0 | 0 | .00000 |
| 430 | 1 | 1 | 0 | 1 | 0 | 1 | 1 | 1 | 0 | 0 | 0 | .00000 |
| 431 | 1 | 1 | 0 | 1 | 0 | 1 | 1 | 1 | 1 | 1 | 4 | .00000 |
| 432 | 1 | 1 | 0 | 1 | 1 | 0 | 0 | 0 | 0 | 3 | 992 | 41.33065 |
| 433 | 1 | 1 | 0 | 1 | 1 | 0 | 0 | 0 | 1 | 3 | 1 | .00000 |
| 434 | 1 | 1 | 0 | 1 | 1 | 0 | 0 | 1 | 0 | 3 | 99 | 2.02020 |
| 435 | 1 | 1 | 0 | 1 | 1 | 0 | 0 | 1 | 1 | 3 | 104 | .96154 |
| 436 | 1 | 1 | 0 | 1 | 1 | 0 | 1 | 0 | 0 | 2 | 633 | 49.23910 |
| 437 | 1 | 1 | 0 | 1 | 1 | 0 | 1 | 0 | 1 | 0 | 0 | .00000 |
| 438 | 1 | 1 | 0 | 1 | 1 | 0 | 1 | 1 | 0 | 3 | 3515 | 37.04125 |
| 439 | 1 | 1 | 0 | 1 | 1 | 0 | 1 | 1 | 1 | 3 | 1239 | 8.55529 |
| 440 | 1 | 1 | 0 | 1 | 1 | 1 | 0 | 0 | 0 | 3 | 568 | .35211 |
| 441 | 1 | 1 | 0 | 1 | 1 | 1 | 0 | 0 | 1 | 3 | 222 | .00000 |
| 442 | 1 | 1 | 0 | 1 | 1 | 1 | 0 | 1 | 0 | 3 | 64 | .00000 |
| 443 | 1 | 1 | 0 | 1 | 1 | 1 | 0 | 1 | 1 | 3 | 848 | .00000 |
| 444 | 1 | 1 | 0 | 1 | 1 | 1 | 1 | 0 | 0 | 3 | 46 | 2.17391 |
| 445 | 1 | 1 | 0 | 1 | 1 | 1 | 1 | 0 | 1 | 3 | 9 | 22.22222 |
| 446 | 1 | 1 | 0 | 1 | 1 | 1 | 1 | 1 | 0 | 3 | 281 | 2.13523 |
| 447 | 1 | 1 | 0 | 1 | 1 | 1 | 1 | 1 | 1 | 3 | 1349 | 1.40845 |
| 448 | 1 | 1 | 1 | 0 | 0 | 0 | 0 | 0 | 0 | 0 | 5362 | 25.25177 |
| 449 | 1 | 1 | 1 | 0 | 0 | 0 | 0 | 0 | 1 | 0 | 50 | 42.00000 |
| 450 | 1 | 1 | 1 | 0 | 0 | 0 | 0 | 1 | 0 | 1 | 5 | 40.00000 |
| 451 | 1 | 1 | 1 | 0 | 0 | 0 | 0 | 1 | 1 | 1 | 33 | 43.43435 |
| 452 | 1 | 1 | 1 | 0 | 0 | 0 | 1 | 0 | 0 | 0 | 63 | 39.63254 |
| 453 | 1 | 1 | 1 | 0 | 0 | 0 | 1 | 0 | 1 | 1 | 17 | 41.17647 |
| 454 | 1 | 1 | 1 | 0 | 0 | 0 | 1 | 1 | 0 | 1 | 43 | 37.20930 |
| 455 | 1 | 1 | 1 | 0 | 0 | 0 | 1 | 1 | 1 | 0 | 463 | 42.76458 |
| 456 | 1 | 1 | 1 | 0 | 0 | 1 | 0 | 0 | 0 | 1 | 531 | 17.70245 |
| 457 | 1 | 1 | 1 | 0 | 0 | 1 | 0 | 0 | 1 | 1 | 505 | 33.86139 |
| 458 | 1 | 1 | 1 | 0 | 0 | 1 | 0 | 1 | 0 | 0 | 0 | .00000 |
| 459 | 1 | 1 | 1 | 0 | 0 | 1 | 0 | 1 | 1 | 1 | 53 | 13.79310 |
| 460 | 1 | 1 | 1 | 0 | 0 | 1 | 1 | 0 | 0 | 1 | 17 | .00000 |
| 461 | 1 | 1 | 1 | 0 | 0 | 1 | 1 | 0 | 1 | 1 | 6 | 16.66667 |
| 462 | 1 | 1 | 1 | 0 | 0 | 1 | 1 | 1 | 0 | 1 | 14 | .00000 |
| 463 | 1 | 1 | 1 | 0 | 0 | 1 | 1 | 1 | 1 | 1 | 286 | 19.23077 |
| 464 | 1 | 1 | 1 | 0 | 1 | 0 | 0 | 0 | 0 | 2 | 150 | 7.33333 |
| 465 | 1 | 1 | 1 | 0 | 1 | 0 | 0 | 0 | 1 | 2 | 1 | .00000 |
| 466 | 1 | 1 | 1 | 0 | 1 | 0 | 0 | 1 | 0 | 3 | 54 | 1.85185 |
| 467 | 1 | 1 | 1 | 0 | 1 | 0 | 0 | 1 | 1 | 3 | 15 | 26.66667 |
| 468 | 1 | 1 | 1 | 0 | 1 | 0 | 1 | 0 | 0 | 3 | 1 | .00000 |
| 469 | 1 | 1 | 1 | 0 | 1 | 0 | 1 | 0 | 1 | 0 | 0 | .00000 |
| 470 | 1 | 1 | 1 | 0 | 1 | 0 | 1 | 1 | 0 | 2 | 27 | 43.14815 |
| 471 | 1 | 1 | 1 | 0 | 1 | 0 | 1 | 1 | 1 | 2 | 11 | 27.27273 |
| 472 | 1 | 1 | 1 | 0 | 1 | 1 | 0 | 0 | 0 | 2 | 901 | 47.72475 |
| 473 | 1 | 1 | 1 | 0 | 1 | 1 | 0 | 0 | 1 | 3 | 583 | 38.09524 |
| 474 | 1 | 1 | 1 | 0 | 1 | 1 | 0 | 1 | 0 | 3 | 35 | 2.85714 |
| 475 | 1 | 1 | 1 | 0 | 1 | 1 | 0 | 1 | 1 | 3 | 1107 | 9.12376 |
| 476 | 1 | 1 | 1 | 0 | 1 | 1 | 1 | 0 | 0 | 2 | 26 | 30.76923 |
| 477 | 1 | 1 | 1 | 0 | 1 | 1 | 1 | 0 | 1 | 2 | 1 | .00000 |
| 478 | 1 | 1 | 1 | 0 | 1 | 1 | 1 | 1 | 0 | 3 | 39 | 17.94872 |
| 479 | 1 | 1 | 1 | 0 | 1 | 1 | 1 | 1 | 1 | 3 | 434 | 27.18894 |

Table -continued

| NO | X1 | X2 | X3 | X4 | X5 | X6 | X7 | X8 | X9 | Y | FREQUENCY | ERROR PERCENT |
|---|---|---|---|---|---|---|---|---|---|---|---|---|
| 480 | 1 | 1 | 1 | 1 | 0 | 0 | 0 | 0 | 0 | 1 | 617 | 7.45543 |
| 481 | 1 | 1 | 1 | 1 | 0 | 0 | 0 | 0 | 1 | 1 | 12 | .00000 |
| 482 | 1 | 1 | 1 | 1 | 0 | 0 | 0 | 1 | 0 | 0 | 0 | .00000 |
| 483 | 1 | 1 | 1 | 1 | 0 | 0 | 0 | 1 | 1 | 1 | 18 | 11.11111 |
| 484 | 1 | 1 | 1 | 1 | 0 | 0 | 1 | 0 | 0 | 1 | 524 | 17.93893 |
| 485 | 1 | 1 | 1 | 1 | 0 | 0 | 1 | 0 | 1 | 1 | 16 | 12.50000 |
| 486 | 1 | 1 | 1 | 1 | 0 | 0 | 1 | 1 | 0 | 1 | 73 | 12.32877 |
| 487 | 1 | 1 | 1 | 1 | 0 | 0 | 1 | 1 | 1 | 1 | 333 | 9.76331 |
| 488 | 1 | 1 | 1 | 1 | 0 | 1 | 0 | 0 | 0 | 1 | 116 | 3.44828 |
| 489 | 1 | 1 | 1 | 1 | 0 | 1 | 0 | 0 | 1 | 1 | 40 | 5.00000 |
| 490 | 1 | 1 | 1 | 1 | 0 | 1 | 0 | 1 | 0 | 0 | 0 | .00000 |
| 491 | 1 | 1 | 1 | 1 | 0 | 1 | 0 | 1 | 1 | 1 | 4 | .00000 |
| 492 | 1 | 1 | 1 | 1 | 0 | 1 | 1 | 0 | 0 | 1 | 35 | 8.57143 |
| 493 | 1 | 1 | 1 | 1 | 0 | 1 | 1 | 0 | 1 | 1 | 10 | .00000 |
| 494 | 1 | 1 | 1 | 1 | 0 | 1 | 1 | 1 | 0 | 1 | 2 | .00000 |
| 495 | 1 | 1 | 1 | 1 | 0 | 1 | 1 | 1 | 1 | 1 | 23 | .00000 |
| 496 | 1 | 1 | 1 | 1 | 1 | 0 | 0 | 0 | 0 | 2 | 907 | 36.82470 |
| 497 | 1 | 1 | 1 | 1 | 1 | 0 | 0 | 0 | 1 | 2 | 13 | 38.46154 |
| 498 | 1 | 1 | 1 | 1 | 1 | 0 | 0 | 1 | 0 | 3 | 35 | 2.85714 |
| 499 | 1 | 1 | 1 | 1 | 1 | 0 | 0 | 1 | 1 | 3 | 27 | 22.22222 |
| 500 | 1 | 1 | 1 | 1 | 1 | 0 | 1 | 0 | 0 | 3 | 565 | 43.00885 |
| 501 | 1 | 1 | 1 | 1 | 1 | 0 | 1 | 0 | 1 | 2 | 5 | 20.00000 |
| 502 | 1 | 1 | 1 | 1 | 1 | 0 | 1 | 1 | 0 | 3 | 791 | 14.91783 |
| 503 | 1 | 1 | 1 | 1 | 1 | 0 | 1 | 1 | 1 | 3 | 439 | 23.92938 |
| 504 | 1 | 1 | 1 | 1 | 1 | 1 | 0 | 0 | 0 | 3 | 4004 | 14.18581 |
| 505 | 1 | 1 | 1 | 1 | 1 | 1 | 0 | 0 | 1 | 3 | 705 | 12.90780 |
| 506 | 1 | 1 | 1 | 1 | 1 | 1 | 0 | 1 | 0 | 3 | 99 | .00000 |
| 507 | 1 | 1 | 1 | 1 | 1 | 1 | 0 | 1 | 1 | 3 | 1151 | 3.99652 |
| 508 | 1 | 1 | 1 | 1 | 1 | 1 | 1 | 0 | 0 | 3 | 636 | 12.57862 |
| 509 | 1 | 1 | 1 | 1 | 1 | 1 | 1 | 0 | 1 | 3 | 72 | 22.22222 |
| 510 | 1 | 1 | 1 | 1 | 1 | 1 | 1 | 1 | 0 | 3 | 949 | 1.36986 |
| 511 | 1 | 1 | 1 | 1 | 1 | 1 | 1 | 1 | 1 | 2 | 17334 | 39.05462 |

As will be appreciated, the interpolation means 31 may comprise a suitable memory, such as a programmable read only memory (PROM), for storing a look-up table containing digital representations of the assigned or predicted gray scale values for the different input matrix patterns. In that event, each input or prediction matrix pattern is used to provide an appropriate address code, thereby causing the interpolation means 31 to output a digital representation of the predicted gray scale level assigned to the input matrix pattern. Alternatively, of course, hardwired logic (not shown) could be provided to carry out that function. Indeed, the configuration for a logic circuit matched to the gray scale interpolation truth table may be readily obtained through the use of commercially available, computer assisted logic design techniques.

The timing of the interpolator 12 is controlled by the clock pulses supplied by the interpolation control unit 22 so that there is ample for for transients at the inputs of the interpolation means 31 to settle out before the gray scale predictions are made. Typically, the input video data elements are propogated through the registers 31-34 as the clock pulses go to a high (1) logic level, and the gray scale predictions are made as the clock pulses drop to a low (0) logic level.

It is practical to individually assign a predicted gray scale value to each of the different matrix patterns when the input or prediction matrix is small. However, as the size of the prediction matrix is increased, there is a corresponding increase in the memory capacity or the logic circuitry necessary to accommodate that approach. Thus, for larger matrices it may be more feasible to accept a sub-optimum predictor so that infrequent and/or substantially equiprobable gray scale predictions can be assigned values leading to the simplest logic realization.

CONCLUSION

In view of the foregoing, it will now be understood that the present invention provides methods and means for recovering expanded gray scale information from a quantized video signal.

What is claimed is:

1. In a raster scanned imaging system, the improvement comprising an interpolator for receiving expanded gray scale information from quantized data elements of a video input signal, said interpolator including
multi-stage register means having outputs taken from predetermined stages to define a $m \times n$ prediction matrix, means for serially propogating the data elements of said input signal through the stages of said register means, whereby successive patterns of video input data elements are sequentially entered into said prediction matrix, and interpolation means coupled to the output of said register means for sequentially predicting gray scale values for successive video output data elements in response to said matrix patterns, the prediction matrix for each of said video output data elements including a spatially corresponding input data element along with vertically and horizontally adjacent input data elements.

2. The improvement of claim 1 wherein $m$ and $n$ are odd integers, and the prediction matrix pattern for each video output data element is symmetrical with respect to said output data element.

3. The improvement of claim 1 wherein the gray scale values predicted by said interpolation means in response to different prediction matrix patterns are statistically pre-selected to reduce expected prediction errors.

4. The improvement of claim 3 wherein said gray scale values are pre-selected to minimize the expected prediction errors, whereby said gray scale values are introduced with minimum statistical error.

5. The improvement of claim 1 wherein said quantized input data elements have gray scale levels from a set $(0,1,2, \ldots I)$ and said interpolation means predicts gray scale values for said output data elements from another set $(0,1,2, \ldots J)$, where $I < J$.

6. The improvement of claim 5 wherein the predicted gray scale values for different prediction matrix patterns are statistically preselected so that $$P(y'/X) \geq P(y/X) \text{ for all } y \neq y'$$

where $X =$ a term representing any given matrix pattern;
$y =$ an observed gray scale value for the given matrix pattern X;
$y' =$ a predicted gray scale value selected for the given matrix pattern X; and
$P =$ a probability statement:

whereby a maximum likelihood gray scale predictor is provided for each of the prediction matrix patterns.

7. The improvement of claim 6 wherein $m$ and $n$ are odd integers, and the prediction matrix pattern for each video output data element is symmetrical with respect to that data element.

8. The improvement of claim 7 wherein said input data elements are binary, and the predicted gray scale values are digitally represented.

9. The improvement of claim 1 wherein said raster scanned imaging system is a digital facsimile system having a transmitting terminal and a receiving terminal, and said interpolator is contained within said receiving terminal.

10. The improvement of claim 9 wherein the gray scale values predicted by said interpolation means in response to different prediction matrix patterns are pre-selected on the basis of statistics collected from representative subject copy for said facsimile system to reduce expected prediction errors.

11. The improvement of claim 10 wherein $m$ and $n$ are odd integers, and the prediction matrix pattern for each video output data element is symmetrical with respect to that data element.

12. The improvement of claim 10 wherein said predicted gray scale values are statistically pre-selected to minimize said expected prediction errors, whereby the gray scale values for said video output data elements are predicted with minimum statistical error.

13. The improvement of claim 1 wherein said interpolator is within a receiver for a digital facsimile system to provide increased gray scale information for facsimile copy generated by said receiver.

14. The improvement of claim 13 wherein the predicted gray scale values for different prediction matrix patterns are pre-selected on the basis of statistics collected from representative sample copy for said facsimile system, including a probability distribution $P(y'/X)$ and another probability distribution $p(X)$, where $X =$ a term representing any given prediction matrix pattern; and
$y =$ an observed gray scale value for the given matrix pattern X.

15. The improvement of claim 14 wherein the predicted gray scale values for the different prediction matrix patterns are selected so that $$P(y'/X) \geq P(y/X) \text{ for all } y \neq y'$$

where $y' =$ the predicted gray scale value provided in response to a given prediction matrix pattern X, thereby providing a maximum likelihood gray scale predictor for each of said prediction matrix patterns.

16. The improvement of claim 15 wherein $m$ and $n$ are odd integers, and a symmetrical relationship is maintained between the prediction matrix patterns and the video output data elements.

17. A method for recovering expanded gray scale information for video output data elements of a raster scanned imaging system having a video input signal defined by a series of quantized data elements, said method comprising the steps of assembling successive pluralities of said video input data elements in a $m \times n$ matrix to sequentially define a series of matrix patterns, predicting statistically likely gray scale values for successive video output data elements in response to at least certain ones of the data elements of said matrix patterns, and maintaining a predetermined relationship between said matrix patterns and said video output data elements, whereby the gray scale value for each of said video output data elements is predicted in response to a matrix pattern containing an input data element spatially corresponding to the output data element for which the prediction is made and other input data elements vertically and horizontally adjacent said spatially corresponding input data element.

18. The method of claim 17 wherein $m$ and $n$ are odd integers, and a symmetrical relationship is maintained between said matrix patterns and said video output data elements.

19. The method of claim 17 wherein the gray scale values to be predicted in response to different matrix patterns are pre-selected on the basis of statistics collected from representative input copy for said imaging system to minimize expected prediction errors, whereby said gray scale values are introduced with minimum statistical error.

20. The method of claim 19 wherein said raster scanned imaging system is a digital facsimile system.

21. The method of claim 17 further comprising a preliminary step of collecting statistics from representative input copy for said imaging system to determine one probability distribution $P(y/X)$ and another probability distribution $P(X)$
where
$X =$ a term representing any given prediction matrix pattern; and
$y =$ an observed scale value for the given matrix pattern X; and
wherein the gray scale values to be predicted in response to different matrix patterns are pre-selected so that
$$P(y'/X) \geq P(y/X) \text{ for all } y \neq y'$$
where
$y' =$ the gray scale value to be predicted in response to the given matrix pattern X, whereby a maximum likelihood gray scale predictor is provided in response to each of the prediction matrix patterns.

22. The method of claim 21 wherein $m$ and $n$ are odd integers, and a symmetrical relationship is maintained between said matrix patterns and said video output data elements.

23. The method of claim 21 wherein said raster scanned imaging system is a digital facsimile system having a transmitting terminal and a receiving terminal, and said video data elements are assembled in said prediction matrix at said receiving terminal to locally predict the gray scale values for said video output data elements.

24. The method of claim 23 further including the steps of
compressing said video signal at said transmitting terminal, and
decompressing said video signal at said receiving terminal prior to assembling said input data elements in said prediction matrix.

25. The method of claim 24 wherein the predicted gray scale values for said video output data elements are digitally represented.

26. The method of claim 25 wherein $m$ and $n$ are odd integers, and a symmetrical relationship is maintained between said matrix patterns and said video output data elements.

* * * * *